US011622100B2

(12) United States Patent
Blase et al.

(10) Patent No.: US 11,622,100 B2
(45) Date of Patent: Apr. 4, 2023

(54) 360-DEGREE VIRTUAL-REALITY SYSTEM FOR DYNAMIC EVENTS

(71) Applicant: flexxCOACH VR, Colorado Springs, CO (US)

(72) Inventors: Keith A. Blase, Colorado Springs, CO (US); Ronald G. Prociw, Phoenix, AZ (US)

(73) Assignee: FLEXXCOACH VR, Colorado Springs, CO (US)

( * ) Notice: Subject to any disclaimer, the term of this patent is extended or adjusted under 35 U.S.C. 154(b) by 0 days.

(21) Appl. No.: 17/177,923

(22) Filed: Feb. 17, 2021

(65) Prior Publication Data

US 2022/0264075 A1   Aug. 18, 2022

(51) Int. Cl.
*H04N 13/282* (2018.01)
*G02B 27/01* (2006.01)
(Continued)

(52) U.S. Cl.
CPC ....... *H04N 13/282* (2018.05); *G02B 27/0093* (2013.01); *G02B 27/0172* (2013.01);
(Continued)

(58) Field of Classification Search
CPC ............... H04N 13/282; H04N 13/167; H04N 2013/0096; H04N 5/23238; H04N 7/185; H04N 21/21805; H04N 21/6587; H04N 5/2257; H04N 5/2258; H04N 5/23218; H04N 13/0096; G02B 27/0093; G02B 27/0172; G02B 13/06; G02B 2027/0138;
(Continued)

(56) References Cited

U.S. PATENT DOCUMENTS 6,778,211 B1 * 8/2004 Zimmermann ........ H04N 5/272
348/E7.071
6,819,354 B1 * 11/2004 Foster ..................... A42B 3/20
348/157

(Continued)

OTHER PUBLICATIONS

S. Kasahara, S. Nagai and J. Rekimoto, "Jackin Head: Immersive Visual Telepresence System with Omnidirectional Wearable Camera," in IEEE Transactions on Visualization and Computer Graphics, vol. 23, No. 3, pp. 1222-1234, Mar. 1, 2017, doi: 10.1109/TVCG.2016.2642947. (Year: 2017).*

(Continued)

*Primary Examiner* — Charles L Beard
(74) *Attorney, Agent, or Firm* — Martensen IP; Michael C. Martensen

(57) ABSTRACT

A dynamic event capturing and rendering system collects and aggregates video, audio, positional, and motion data to create a comprehensive user perspective 360-degree rendering of a field of play. An object associated with a user collects data that is stitched together and synchronized to provide post event analysis and training. Through an interface actions that occurred during an event can be recreated providing the viewer with information on what the user associated with the object was experiencing, where the user was looking, and how certain actions may have changed the outcome. Using the collected data, a virtual realty environment is created that can be manipulated to present alternative courses of action and outcomes.

27 Claims, 11 Drawing Sheets

(51) Int. Cl.
*G06F 3/01* (2006.01)
*H04N 13/167* (2018.01)
*G02B 27/00* (2006.01)
*H04N 13/00* (2018.01)

(52) U.S. Cl.
CPC ............ *G06F 3/013* (2013.01); *H04N 13/167* (2018.05); *H04N 2013/0096* (2013.01)

(58) Field of Classification Search
CPC . G02B 2027/0187; G06F 3/013; G06F 1/163; A42B 3/04; A42B 3/042; A42B 3/0426; G06T 3/0018; G06V 20/52
See application file for complete search history.

(56) References Cited

U.S. PATENT DOCUMENTS

| | | | | |
|---|---|---|---|---|
| 7,193,645 | B1* | 3/2007 | Aagaard | H04N 5/222 348/E5.022 |
| 9,473,758 | B1* | 10/2016 | Long | H04N 13/275 |
| 9,686,466 | B1* | 6/2017 | Billinghurst | H04N 5/232945 |
| 9,865,055 | B2* | 1/2018 | Cole | H04N 13/232 |
| 10,048,751 | B2* | 8/2018 | Jaafar | G06F 3/0482 |
| 10,067,737 | B1* | 9/2018 | Ozery | H04R 3/005 |
| 10,088,898 | B2* | 10/2018 | Khalid | G06T 15/005 |
| 10,156,898 | B2* | 12/2018 | Prosserman | H04S 7/302 |
| 10,300,362 | B2* | 5/2019 | Reilly | A63B 69/0024 |
| 10,380,798 | B2* | 8/2019 | He | A63F 13/573 |
| 10,401,960 | B2* | 9/2019 | Khalid | G06F 3/013 |
| 10,419,738 | B1* | 9/2019 | Phillips | H04N 21/816 |
| 10,438,369 | B2* | 10/2019 | Cole | A63F 13/65 |
| 10,477,186 | B2* | 11/2019 | Sheridan | H04N 13/194 |
| 10,486,050 | B2* | 11/2019 | Reilly | G06K 9/00724 |
| 10,486,061 | B2* | 11/2019 | Vandonkelaar | G06V 20/52 |
| 10,567,641 | B1* | 2/2020 | Rueckner | H04N 5/23218 |
| 10,643,301 | B2* | 5/2020 | Coban | G06T 3/0087 |
| 10,666,856 | B1* | 5/2020 | Rueckner | H04N 5/2258 |
| 10,717,001 | B2* | 7/2020 | Vandonkelaar | H04N 5/247 |
| 10,751,609 | B2* | 8/2020 | Vandonkelaar | A63F 13/213 |
| 10,821,347 | B2* | 11/2020 | Reilly | A63B 69/0071 |
| 10,846,535 | B2* | 11/2020 | Leppanen | G06K 9/00751 |
| 10,853,915 | B2* | 12/2020 | Brandt | H04N 13/111 |
| 10,915,986 | B2* | 2/2021 | Coban | G06T 17/00 |
| 11,014,000 | B2* | 5/2021 | Koyama | A63F 13/577 |
| 11,116,271 | B2* | 9/2021 | Ciccaglione | A42B 3/185 |
| 11,132,838 | B2* | 9/2021 | Cordes | H04N 5/2224 |
| 2005/0062869 | A1* | 3/2005 | Zimmermann | G06T 3/20 348/E7.071 |
| 2009/0195652 | A1* | 8/2009 | Gal | H04N 5/23216 348/148 |
| 2009/0237564 | A1* | 9/2009 | Kikinis | H04N 13/398 386/326 |
| 2012/0320169 | A1* | 12/2012 | Bathiche | G02B 27/017 348/53 |
| 2013/0215281 | A1* | 8/2013 | Hobby | H04N 5/2252 348/207.1 |
| 2013/0222590 | A1* | 8/2013 | O'Brien | H04N 7/185 348/148 |
| 2014/0075655 | A1* | 3/2014 | Ratner | A42B 3/042 2/422 |
| 2014/0362244 | A1* | 12/2014 | Martin | H04N 5/23203 348/211.2 |
| 2015/0062293 | A1* | 3/2015 | Cho | G06F 3/0346 348/39 |
| 2015/0097719 | A1* | 4/2015 | Balachandreswaran | G01B 11/002 342/147 |
| 2015/0153571 | A1* | 6/2015 | Ballard | G06F 3/0482 345/8 |
| 2015/0248772 | A1* | 9/2015 | Gove | H04N 5/247 348/158 |
| 2015/0261291 | A1* | 9/2015 | Mikhailov | G02B 27/0093 345/156 |
| 2015/0271367 | A1* | 9/2015 | Musec | H04N 5/2252 348/376 |
| 2015/0362733 | A1* | 12/2015 | Spivack | G02B 27/017 345/633 |
| 2016/0035140 | A1* | 2/2016 | Bickerstaff | G02B 27/0172 345/633 |
| 2016/0041391 | A1* | 2/2016 | Van Curen | A63F 13/211 345/633 |
| 2016/0080874 | A1* | 3/2016 | Fullam | G06F 3/013 381/313 |
| 2016/0086379 | A1* | 3/2016 | Sadi | G02B 27/0093 345/633 |
| 2016/0088287 | A1* | 3/2016 | Sadi | H04N 13/194 348/43 |
| 2016/0093105 | A1* | 3/2016 | Rimon | G06Q 50/01 345/633 |
| 2016/0113345 | A1* | 4/2016 | Kolotov | A42B 3/042 2/422 |
| 2016/0140766 | A1* | 5/2016 | Balachandreswaran | G06F 3/005 345/633 |
| 2016/0182903 | A1* | 6/2016 | Grundhöfer | H04N 17/002 348/187 |
| 2016/0191891 | A1* | 6/2016 | Gilpin | H04N 5/77 386/224 |
| 2016/0210785 | A1* | 7/2016 | Balachandreswaran | G02B 27/0172 |
| 2016/0246061 | A1* | 8/2016 | Bickerstaff | H04N 5/23238 |
| 2016/0253795 | A1* | 9/2016 | Cole | G06T 11/40 345/426 |
| 2016/0284048 | A1* | 9/2016 | Rekimoto | G06F 3/012 |
| 2016/0337630 | A1* | 11/2016 | Raghoebardajal | H04N 13/344 |
| 2016/0342840 | A1* | 11/2016 | Mullins | G06F 3/14 |
| 2016/0361658 | A1* | 12/2016 | Osman | A63F 13/525 |
| 2016/0364916 | A1* | 12/2016 | Terahata | G06F 3/0346 |
| 2017/0011557 | A1* | 1/2017 | Lee | G06F 3/04842 |
| 2017/0018217 | A1* | 1/2017 | Ogino | H04N 5/23238 |
| 2017/0061936 | A1* | 3/2017 | Matsuyama | G06F 3/012 |
| 2017/0072283 | A1* | 3/2017 | Davisson | H04N 5/272 |
| 2017/0118458 | A1* | 4/2017 | Grönholm | H04N 13/243 |
| 2017/0151484 | A1* | 6/2017 | Reilly | A63B 69/0024 |
| 2017/0177941 | A1* | 6/2017 | Mullins | G06T 19/00 |
| 2017/0208292 | A1* | 7/2017 | Smits | H04N 13/275 |
| 2017/0221264 | A1* | 8/2017 | Perry | G06F 3/013 |
| 2017/0269685 | A1* | 9/2017 | Marks | A63F 13/533 |
| 2017/0285737 | A1* | 10/2017 | Khalid | G06F 3/04842 |
| 2017/0285738 | A1* | 10/2017 | Khalid | G06T 15/20 |
| 2017/0289219 | A1* | 10/2017 | Khalid | H04N 21/816 |
| 2017/0330365 | A1* | 11/2017 | Adamov | H04L 67/131 |
| 2017/0330382 | A1* | 11/2017 | Adamov | H04L 67/566 |
| 2017/0351325 | A1* | 12/2017 | Hashimoto | A63F 13/213 |
| 2017/0358141 | A1* | 12/2017 | Stafford | G06F 3/011 |
| 2017/0364153 | A1* | 12/2017 | Kazansky | G06F 3/011 |
| 2018/0031845 | A1* | 2/2018 | Yoshioka | G03B 25/02 |
| 2018/0054568 | A1* | 2/2018 | Sugawara | G02B 27/0172 |
| 2018/0084257 | A1* | 3/2018 | Abbas | H04N 19/147 |
| 2018/0146167 | A1* | 5/2018 | Vaziri | H04N 5/2254 |
| 2018/0184000 | A1* | 6/2018 | Lee | G06F 3/04815 |
| 2018/0197309 | A1* | 7/2018 | Cole | G06T 19/003 |
| 2018/0199029 | A1* | 7/2018 | Van Der Auwera | H04N 5/2628 |
| 2018/0225805 | A1* | 8/2018 | Brandt | H04N 13/111 |
| 2018/0268516 | A1* | 9/2018 | Coban | H04N 19/85 |
| 2018/0268517 | A1* | 9/2018 | Coban | H04N 19/174 |
| 2018/0276789 | A1* | 9/2018 | Van Der Auwera | G06T 3/4038 |
| 2018/0276826 | A1* | 9/2018 | Van Der Auwera | H04N 19/182 |
| 2018/0278936 | A1* | 9/2018 | Hendry | H04N 19/126 |
| 2018/0321742 | A1* | 11/2018 | Khalid | G06F 3/011 |
| 2018/0330527 | A1* | 11/2018 | Corcoran | H04N 13/398 |
| 2018/0330536 | A1* | 11/2018 | Sawaki | G06F 3/012 |
| 2018/0332219 | A1* | 11/2018 | Corcoran | G06K 9/6267 |
| 2018/0339215 | A1* | 11/2018 | Hu | G09B 19/0038 |
| 2018/0364483 | A1* | 12/2018 | Mallinson | G02B 26/127 |
| 2018/0364485 | A1* | 12/2018 | Mallinson | G06F 3/012 |
| 2018/0364801 | A1* | 12/2018 | Kim | H04N 13/344 |
| 2019/0051055 | A1* | 2/2019 | Leppänen | G06V 20/20 |

(56) References Cited

U.S. PATENT DOCUMENTS

| | | | |
|---|---|---|---|
| 2019/0068529 A1* | 2/2019 | Mullins | H04N 13/332 |
| 2019/0099678 A1* | 4/2019 | Khan | A63F 13/428 |
| 2019/0102941 A1* | 4/2019 | Khan | G06T 19/003 |
| 2019/0134487 A1* | 5/2019 | Kudirka | A63F 13/211 |
| 2019/0166382 A1* | 5/2019 | He | H04N 19/186 |
| 2019/0222823 A1* | 7/2019 | Clagg | H04N 13/344 |
| 2019/0255419 A1* | 8/2019 | Reilly | G09G 3/001 |
| 2019/0293943 A1* | 9/2019 | Weller | H04N 5/23293 |
| 2019/0295285 A1* | 9/2019 | Shinohara | G02B 27/0172 |
| 2019/0379884 A1* | 12/2019 | Oh | H04N 19/167 |
| 2019/0387224 A1* | 12/2019 | Phillips | H04N 19/115 |
| 2019/0387237 A1* | 12/2019 | Phillips | H04N 21/8456 |
| 2020/0015536 A1* | 1/2020 | Ciccaglione | A61F 9/029 |
| 2020/0064439 A1* | 2/2020 | Przybyla | G01S 5/0036 |
| 2020/0081524 A1* | 3/2020 | Schmidt | G06K 9/00671 |
| 2020/0086199 A1* | 3/2020 | Reilly | G09G 5/18 |
| 2020/0174552 A1* | 6/2020 | Stafford | G01C 19/5783 |
| 2020/0213558 A1* | 7/2020 | Tuli | H04N 7/15 |
| 2020/0219300 A1* | 7/2020 | Ishikawa | G03B 37/00 |
| 2020/0234499 A1* | 7/2020 | Hwang | G06T 19/006 |
| 2020/0260063 A1* | 8/2020 | Hannuksela | H04N 21/8456 |
| 2020/0329801 A1* | 10/2020 | Ciccaglione | A42B 3/042 |
| 2020/0341275 A1* | 10/2020 | Muramoto | A63F 13/25 |
| 2020/0342673 A1* | 10/2020 | Lohr | G02B 27/0172 |
| 2020/0351486 A1* | 11/2020 | Chapman | H04N 13/167 |
| 2020/0358960 A1* | 11/2020 | Wu | G02B 13/06 |
| 2021/0069574 A1* | 3/2021 | O'Dowd | G06F 3/013 |
| 2021/0092292 A1* | 3/2021 | Shah | H04N 5/2257 |
| 2021/0144300 A1* | 5/2021 | Kashiwase | G03B 15/00 |
| 2021/0149482 A1* | 5/2021 | Council | G06T 7/246 |
| 2021/0209854 A1* | 7/2021 | Booth | G06T 15/205 |
| 2021/0211826 A1* | 7/2021 | Redmann | H04S 7/304 |
| 2021/0240279 A1* | 8/2021 | Harviainen | G06F 3/013 |
| 2021/0325965 A1* | 10/2021 | Himukashi | G09G 5/36 |
| 2021/0329168 A1* | 10/2021 | Himukashi | G06F 3/014 |
| 2021/0329171 A1* | 10/2021 | Himukashi | H04N 13/106 |
| 2021/0329223 A1* | 10/2021 | Himukashi | G09G 5/36 |
| 2021/0392243 A1* | 12/2021 | Salemnia | G03B 17/04 |
| 2022/0116578 A1* | 4/2022 | Jeong | H04N 13/366 |
| 2022/0187906 A1* | 6/2022 | Jobes | G06F 3/011 |
| 2022/0264075 A1* | 8/2022 | Blase | H04N 13/167 |

OTHER PUBLICATIONS

P. Rangsee, P. Suebsombat and P. Boonyanant, "Simplified low-cost GPS-based tracking system for soccer practice," 2013 13th International Symposium on Communications and Information Technologies (ISCIT), 2013, pp. 724-728, doi: 10.1109/ISCIT.2013.6645948. (Year: 2013).*

A. Ahmadi et al., "Automatic Activity Classification and Movement Assessment During a Sports Training Session Using Wearable Inertial Sensors," 2014 11th International Conference on Wearable and Implantable Body Sensor Networks, 2014, pp. 98-103, doi: 10.1109/BSN.2014.29. (Year: 2014).*

S. Mochiduki, M. Suganuma, G. Shoji and M. Yamada, "Analysis of lines of sight while playing sport using a newly developed lines-of-sight analyzer," 2016 11th International Conference on Computer Science & Education (ICCSE), 2016, pp. 321-326, doi: 10.1109/ICCSE.2016.7581601. (Year: 2016).*

* cited by examiner

360-DEGREE VIRTUAL-REALITY SYSTEM FOR DYNAMIC EVENTS

BACKGROUND OF THE INVENTION

Field of the Invention

Embodiments of the present invention relate, in general, to virtual-reality media systems and more particularly to 360-degree virtual reality media systems which capture and render for review real-time dynamic events.

Relevant Background

Current virtual-reality (VR) recording (audio/video) systems (let alone 360-degree-field-of-view systems) have been concerned neither with the height nor weight of the VR recording device nor the physical impact of either factor (height/weight)—along with its related safety concern—when the VR device is associated with a user during a dynamic event. "Dynamic event" is meant to mean any event in which an object, such as a helmet, is worn by a user, in which the object (and user) may be subject to physical impacts incurred during the event, and in which the activity to be debriefed takes place at such a pace that real-time debriefing, training or learning, generally, is impractical or impossible. Examples of dynamic events include—but are by no means limited to—skiing, hockey, football, baseball, motocross, base-jumping, martial-arts training and the like. This general lack of concern for height, weight and safety aspects of VR devices in dynamic events has meant that state-of-the-art 360-degree VR devices have not been widely used for dynamic-event training or review.

A need thus exists for a data collection and VR system which is able to meet these height/weight/safety constraints by maintaining a low profile or internal integration with respect to the helmet's or object's exterior; capable of sustaining physical impacts to the object which typically occur during dynamic events; and operable to capture, and later render, data from multiple vantage points and perspectives for debriefing, training and learning of real-time-dynamic events. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A 360-degree rendering of a user's visual environment during a dynamic field of play can be captured, stored and rendered for later examination. Correlating the 360-degree rendering with a user's location and motion along with the location and motion of other individuals and objects in a field of play provides the user and others alike the ability to review, critique, train and modify behavior to achieve improved results.

In one embodiment of the present invention a dynamic event capture and rendering system includes two or more cameras affixed to an object wearable by a user. Each camera is configured to capture video with the two or more cameras having overlapping fields of view so as to capture 360-degrees of images surrounding the user. The system also includes a processor capable of executing instruction embodied as code and a non-transitory storage medium tangibly embodying such program of instructions.

These program of instructions include code for combining video from the two or more cameras so as to form a 360-degree rendering. That rendering includes a central plane and a central vision point that can be aligned with the visual field of the user wearing the object and the user's visual fixation point. Instructions are also included to determine a location of the object (and thereby the user associated with the object) as well as the motion of the object within the field of play.

The instructions, executed by the processor, thereafter synchronize the 360-degree rendering with the location and the motion of the object and other forms of collected data and thereafter store the 360-degree rendering, the location, motion of the object, etc. for later analysis.

In other embodiments of the present invention, the system include instructions and related equipment to detect eye movement of the user relative to the object (helmet in one example) so as to identify the user's visual fixation point. Knowing the visual fixation point of the user, additional code is included in another embodiment, to center the central vision point of the 360-degree rendering with the visual fixation point of the user.

In some embodiments the system of the present invention includes a transceiver that can be used to identify a presence of one or more nearby objects (other players), determine a relational location of each nearby objects, and develop a spatial awareness of a local environment surrounding the object (player).

In another version of the present invention the transceivers can receive a signal from one or more transmitters affixed at a known location relative to the field of play (rink, field, court), and ascertain the location of the object (player) using trilateration or similar techniques. In yet another version an overhead video capture of the entire field of play can be correlated with data collected from each system to determine the location of each object and nearby players at any point in time.

The data collected is combined, correlated and synchronized to form a continuous 360-degree rendering from the point of view of a user (player) on the field of play. This rendering, or a select portion of that rendering, can thereafter be displayed on user interface such as a monitor, virtual reality goggles or the like. In another version of the invention, the display of the 360-degree rendering of one user can also include select portions of the 360-degree rendering of one or more additional objects (user/player) along with the location of the one or more additional objects on the field of play.

Each of these renderings and the data collected by the system of the present invention can, in another embodiment, form a virtual realty data store from which program code can create a virtual reality environment related to the field of play and the dynamic events captured. This information can include the location of the user and others on the field of play as well as events that warrant further analysis.

In some embodiments of the present invention patterns in the data are identified such as key events, opportunities for improved performance or inconsistencies. Using artificial intelligence, the system can identify points in a field in play at which a different action may result in a different outcome. These insights can thereafter be presented to the user, coach, trainer or the like for behavior modifications.

Another version of the present invention is a method for dynamic event capturing and rendering. Such a method includes the steps of capturing video, by each of two or more cameras that are affixed to an object wearable by a user. The video from the two or more cameras have overlapping fields of view which capture the user's visual field the user's visual fixation point.

The method continues by retrieving, from a non-transitory storage medium, a program of instructions that includes a number of program codes. A processer then continues the methodology by accessing captured video from the two or more cameras and executing one or more of the program codes retrieved from the non-transitory storage medium.

The instructions found in the program codes cause the processor to combine video from the two or more cameras to form a 360-degree rendering surrounding the user. This rendering includes a central plane and a central vision point. The instructions also determine a location of the object and a motion of the object within a field of play and synchronize the 360-degree rendering with the location and motion of the object. Lastly the instructions direct the processor to store the 360-degree rendering, the location and the motion of the object.

In some embodiments of the present invention the instructions of code modify/align the central plane of the 360-degree rendering with a visual field of the user. Other instructions detect eye movement of the user relative to the object identifying a user visual fixation point and center and identify the central vision point of the 360-degree rendering about the user visual fixation point. By doing so the exact point at which the user is looking in the 360-degree rendering at any point of time can be determined and presented.

Another step in the process for capturing and rendering dynamic events done by the processor is to identify a presence of one or more nearby objects, determine a relational location of each of the one or more nearby objects, and develop a spatial awareness of a local environment surrounding the object. This provides a picture or environment of players surrounding the user.

The processors can also receive from a transceiver a signal from one or more transmitters affixed at a known location relative to the field of play and ascertain the location of the object using trilateration based on the signal received from the one or more transmitters. With this information the processors can determine location and motion of the object (user).

The transceivers found in the object in conjunction with the processors can also transmit the captured data via a network to a remote location for storage and processing.

The information collected by the cameras and other sensors are correlated so that the 360-degree rendering, location, motion and audio files when combined present a combined and reconstructed field of play environment for analysis. Once combined the methodology can display on a user interface such as monitor or set of VR goggles a select portion of the 360-degree rendering along with the location of the first object on the field of play. Moreover, any portion of the 360-degree rendering other objects (players) on the field of the play can be viewed at the same point of time. These and other renderings, form a virtual reality that can be used to replay the field of play for analysis and training.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
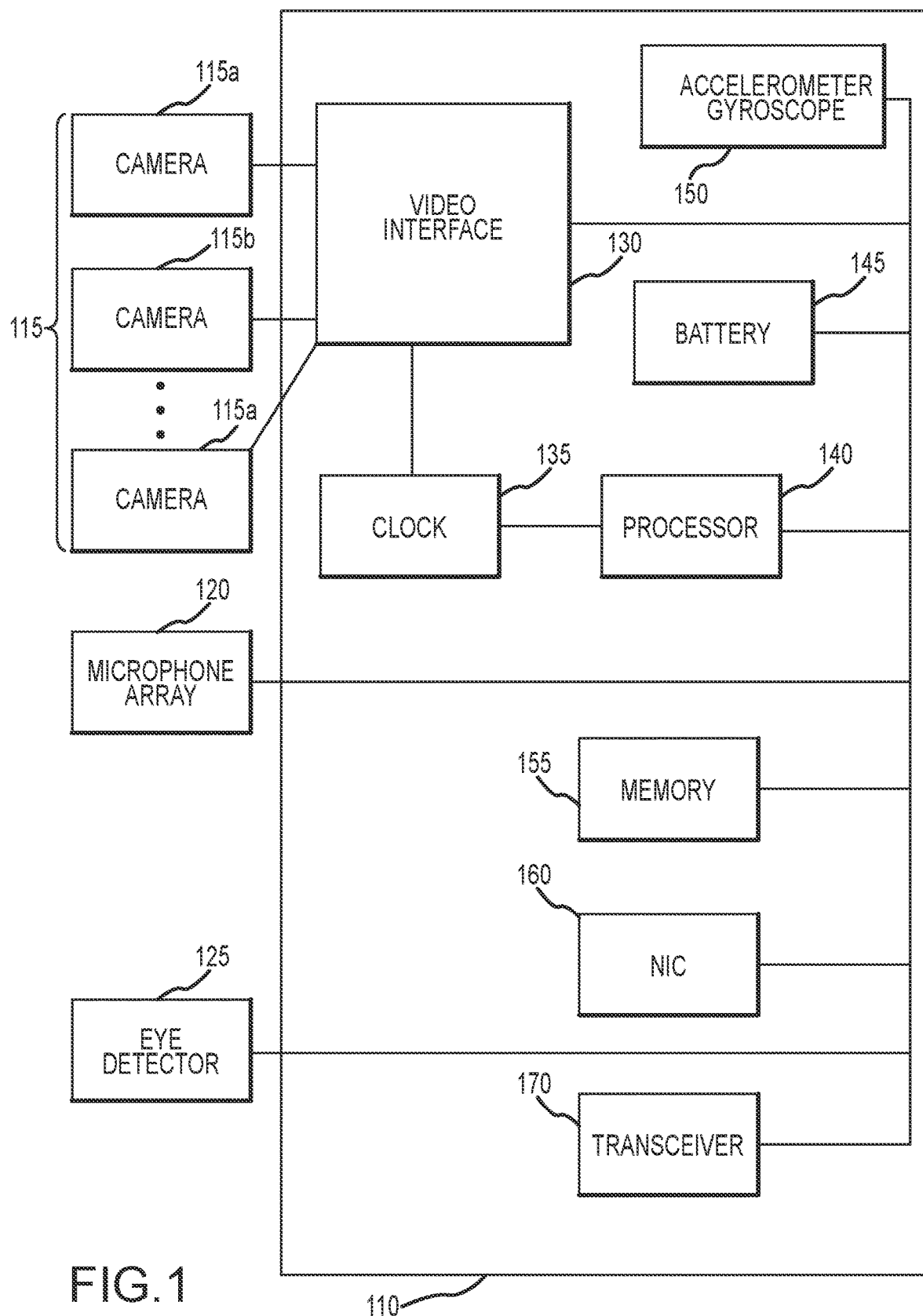
FIG. 1 is a block diagram of an object for capturing and rendering dynamic events according to one embodiment of the present invention.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

The capture and later rendering of a dynamic event in a field of play environment is hereafter described by way of example. A 360-degree rendering of a user's visual environment during a dynamic field of play can be captured, stored and rendered for later examination. Correlating the 360-degree rendering with a user's location and motion, along with the location and motion of other individuals and objects in a field of play, provides the user and others alike the ability to review, critique, train and modify behavior to achieve improved results.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

As used herein, the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Unless otherwise defined below, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the term "fixation point" is meant to mean a central or focused point within a user's field view. When a user focuses or looks at an object, their fixation point is that point on the object which is the subject of interest.

As used herein, the term "field of play" is meant to mean a bounded region in which one or more users engage in a dynamic actively. In sports a field of play can include a hockey rink, a football field, a lacrosse field, a soccer field, or a basketball court. In other environments a field of play may be tactical assault course or firefighting training structure.

As used herein, the term "field of play environment" is meant to mean combined and correlated renderings of users, objects and occurrences of a select field of play including a plurality of dynamic events.

Dynamic events are captured, stored and rendered for later analysis and training through overlapping field of view cameras worn by, and associated with, a user. According to one embodiment of the present invention, two or more wide angle cameras are affixed to, or integrated with, an object worn by a user with overlapping fields of view capturing a 360-degree rendering around the user. In one embodiment of the present invention, three cameras are assembled in an object which is mounted on the top of helmet worn by the user during a particular activity. Each camera possesses a field of view so that when property positioned within the object a 360-degree continuous rendering surrounding the user is captured.

In other embodiments of the present invention, the cameras are integrated into a helmet or head gear worn by the user. In the same manner the fields of view of each camera are sufficient to overlap so as to continually capture the entire 360-degree image surrounding the user.

FIG. 1 is a high-level block diagram of a dynamic event capturing device 100 according to one embodiment of the present invention. The device includes, but is not limited to, a circuit board 110 or similar processing environment, two or more cameras 115a, 115b, 115n, a microphone array 120 and an eye movement and position detector 125.

The processing environment to the device includes a video interface 130, a clock 135, processor 140, battery 145 or similar power source, an accelerometer and/or gyroscope 150, non-transitory memory 155, a network interface card 160 and a transceiver 170. The separation of the various components in the embodiments described herein should not be understood as requiring such separation or each component in all embodiments. It should be understood that the described components may be integrated together in a single component or as separate components to achieve the desired functionality. Additions, modifications, or omissions may be made to the illustrated embodiment without departing from the scope of the disclosure.

While FIG. 1 illustrates an array of cameras 115, one video interface 130, one processor 140, one network card 160, one transceiver 170, one microphone array 120, one eye detection device 125, and one accelerometer 150, the disclosure applies to a system architecture having one or more camera arrays, one or more video interfaces, one or more possessors, one or more network cards, one or more microphone arrays, one or more eye detectors and one or more accelerometers. In practice more than one object may be networked together with various components of each object and their functionality distributed.

The camera array 115 may comprise a modular camera system configured to capture raw video data that includes image frames. While in a preferred environment the camera array for each object includes two or more cameras, the number of cameras is not to be viewed as a limiting requirement. A single camera capable of capturing a seamless 360-degree rendering would fully meet the objectives of the present invention and is indeed contemplated.

Each camera within the camera array 115 may capture video and/or audio data and in the latter instance eliminate the need for a separate microphone array 120. Each camera may record in high definition (HD), 2K video data, 4K+ video data or the like.

In other embodiments of the present invention, each camera may include other sensors including, but not limited to a depth sensor, motion sensor, global positioning system sensor, Ultra-Wide Band receiver, accelerometers and the like. The camera may be fixedly mounted to the processing environment or fixed to an object worn by the user and communicatively coupled to the processing environment.

The cameras 115 may also be configured and positioned to capture different fields of view and with differing degrees of fidelity. For example, a high-definition camera or cameras may be associated with a forward field of view while a lower definition or wide-angle camera may be directed toward a rear facing field of view.

Each camera 115a, 115b . . . 115n is communicatively coupled to a video interface 130. In one embodiment each camera may be coupled to the video interface 130 via a wired line such as a HDMI cable, ethernet wire, universal serial bus cable, RCA cable, Firewire, or similar link while in other embodiments one or more camera may be coupled to the video interface wirelessly via WIFI, Bluetooth or the like.

The video interface 130 may receive the raw video data and forward it for processing or process the video internally. In other embodiments the video interface 130 may receive and aggregate the video streams describing frames captured by each respective camera 115a, 115b . . . 115n. In other embodiments the video interface 130 working with the processor 140 may stitch overlapping video streams together using a graphic processor (not shown) or the like to form a cohesive single image stream encompassing a 360-degree view surrounding the user. In yet other embodiments the video interface 130, processor 140 and network card 160 may prepare video streams for aggregated or singular transmission to a network server for additional processing including stitching together overlapping fields of view.

In another embodiment the video interface 130 is a client-side device that is connected with one or more cameras 115 and/or a storage device having one or more recordings. The client-side device may have one or more interfaces within which a camera 115 or a storage device can be connected and used to input recordings from the camera 115 or a storage device. The video interface 130 may also be connected to the network and upload the recordings from the one or more cameras 115 or the storage device to the virtual reality processing server and/or to the virtual reality data store.

The video interface 130, for example, may be a computer or laptop or may be connected with a computer or a laptop. A camera or a storage device may be connected to the video interface via USB, FireWire, HDMI, etc. Alternatively, or additionally, the client device may include a storage device port such as, for example, an SD port, SD slot.

In another embodiment, the video interface may include a server-side interface.

The video interface 130 may receive recordings from one or more cameras 115 or an aggregate recording regardless of camera type. The server-side video interface may, for example, be hosted on a web server and/or as part of the virtual reality processing server. The server-side video interface, for example, may provide a number of data entry fields or widgets to collect information such as, for example, the number of camera, the data compression used to save virtual reality content, the brand of the camera, the serial number of the virtual reality, the model of the camera, the type of audio being uploaded, the angular position of the camera modules, the files comprising the video and/or audio data from each individual camera, etc.

In other embodiments, the recordings received from the cameras 115 or the video interface 130 may be uploaded to the virtual reality processing server and/or stored in the data store. The virtual reality processing server may receive raw video data and raw audio data from the video interface via the network. The virtual reality server may store the data as virtual reality data. In other embodiments the virtual reality server may aggregate the video data captured by cameras to form virtual reality streams and combine the virtual reality streams with audio data to form virtual reality content that is stored in the data store as virtual reality data.

The virtual reality processing server may include a system configured to aggregate raw video data and raw audio data to generate 3D video data and 3D audio data, respectively. In some other embodiments, the virtual reality processing server may be implemented using a combination of hardware and software. The virtual reality processing server, which may reside in the cloud, may be configured for aggregating raw video data captured by two or more cameras including data from two or more different objects. For example, the virtual reality processing server may be configured to receive data from a first object and a one or more additional objects, determine parameters for each system of the plurality of camera systems, and aggregate data from two or more of the plurality of camera systems.

In other embodiments, the virtual reality processing server may create a virtual reality project from the virtual reality recordings uploaded to the virtual reality data store. A virtual reality project may include, for example, virtual reality recordings, segments, and/or renderings.

Virtual reality renders may be created in any number of ways by the virtual reality processing server. In some embodiments, the virtual reality processing server may identify a location and/or a timing associated with each of the camera modules within a camera array. The virtual reality processing server may synchronize the various video frames within a segment and/or recording based on locations and/or timings associated with the camera modules.

The microphone array 120 may be associated with each camera or include separate components positioned on the object worn by the user. In one embodiment of the present invention the microphones are directional and positioned about the object to record and store audio file as well as a directional source of the audio transmission. The microphone array 120 may include different microphone systems and may include, like the cameras, separate processors and storage mechanisms.

The microphone array 120 can capture sound from different directions and store raw audio data on a non-transitory storage medium. The data, like the video files, can be processed internally on the object or transmitted via the network card to a network server for later processing. In some embodiments, the microphone array 120 may include sound field tetrahedral microphones following the principles of ambisonics, enabling reconstruction of sound from any arbitrary direction. The position and configuration of the microphones can be independent of cameras or in other embodiments, they may coexist.

In some embodiments, the cameras 115 may be mounted around or within a camera housing (e.g., a spherical housing or a housing with another suitable shape). The microphone array may include multiple microphones mounted around the same camera housing, with each microphone located in a different position. The camera housing may act as a proxy for the head-shadow sound-blocking properties of a human head.

Another component of the device for capturing and rendering dynamic events is an eye movement detector 125 and tracker. Eye tracking is the process of measuring either the point of gaze (where one is looking) or the motion of an eye relative to the head. In one embodiment video images of the eye are captured by a detection camera focused on the user's eyes, from which the eye position is extracted. In other embodiments light, typically infrared, is reflected from the eye and sensed by a video camera or some other specially designed optical sensor. The information is then analyzed to extract eye rotation (movement) from changes in reflections. A still more sensitive method of tracking is to image features from inside the eye, such as the retinal blood vessels, and follow these features as the eye rotates. One or more of these or similar techniques to capture eye movement and position is gathered and processed to identify the user's focus.

The device further includes an accelerometer and/or gyroscope to deduce movement (or non-movement) of the device. From a known starting or static position, data gained from a accelerometers in three dimensions, can determine a relative direction and velocity of the object. Using dead reckoning a user's location within the field of play can be roughly determined. Moreover, the system can determine precise timing of events which cause the user and object to abruptly change direction. A fall or impact would register a significant acceleration. This data can be correlated with the video and audio fields to recreate the field of play environment.

The accelerometer and/or gyroscope 150 associated with the present invention are further coupled to the video interface 130 and processor 140 to facilitate video stabilization. As one of reasonable skill in the relevant art will appreciate, dynamic events such as hockey, football and the like involve impacts and sudden changes of direction. This erratic, unpredictable movement can create a video which is unstable and unusable. The present invention stabilizes the 360-degree rendering using data collected by the accelerometer and/or gyroscope to produce a rendering which is stable despite erratic and even violent impacts.

A transceiver 170 is coupled to the system bus and can transmit data wirelessly to a receiver. In doing so real-time video and audio streams can be captured apart from the object for later processing The transceiver can also be used to determine the location of the user/object on the field of play using trilateration or time distance of arrival techniques.

Trilateration is a technique that determines position based on distance information from uniquely identifiable ranging radios. In trilateration, the position of a mobile object can be calculated using the known positions of multiple radio frequency reference beacons (anchors) and measurements of the distances between the mobile object and the anchors. The anchors can pinpoint the mobile object by geometrically forming four or more spheres surrounding the anchors which intersect at a single point, which is the location of the mobile object. Trilateration has strict infrastructure requirements, requiring at least three anchors for a 2D position and four anchors for a 3D position. In some embodiments the surface at the earth (field of play), can act as one sphere.

In another embodiment the location of the object on the field of view can be determined trilateration or TDOA. By having two or more fixed transmitters each object can receive a predetermined signal from a known location. Measuring the differences in time from each location provides a range or sphere on which the object must exist. Using the surface of the field of play as an additional sphere on which the object resides, the position of the object can be determined.

Time Distance of Arrival ("TDOA") determines an object's location by merely receiving broadcast signals rather than transmit and receive as in trilateration. In TDOA a plurality of nodes, such as in a Radio localization system, broadcast a signal at a precise time. The receiving node receives two or more packets related to the same signal and notes each time of arrival. Knowing the location of the transmitting nodes and the different times that the same signal arrived at the receiving node, the receiving nodes location can be determined. When any two other nodes in the area perform a two-way ranging conversation, a node can overhear both the request packet and the response packet and measures the time difference of arrival of each. This time difference along with the locations and location errors of these transmitters (which they included in their signal) is used for updating current position of the eaves dropping node.

By using one or more these techniques or an overhead video capture analysis, the location of the object can be determined in the field of play. As the user moves throughout the field of play the location of the object, and thus the user, is determined by a location module. In this embodiment of the present invention, an overhead video stream of the field of play and the user's location on the field is recorded and synchronized with the 360-degree rendering and visual fixation point. In such an embodiment each object can possess a unique RF beacon or visual marker that can be observed/detected by an overhead sensor. The sensor thereafter communicates the data to the rendering system via the communication module.

Figure 2:
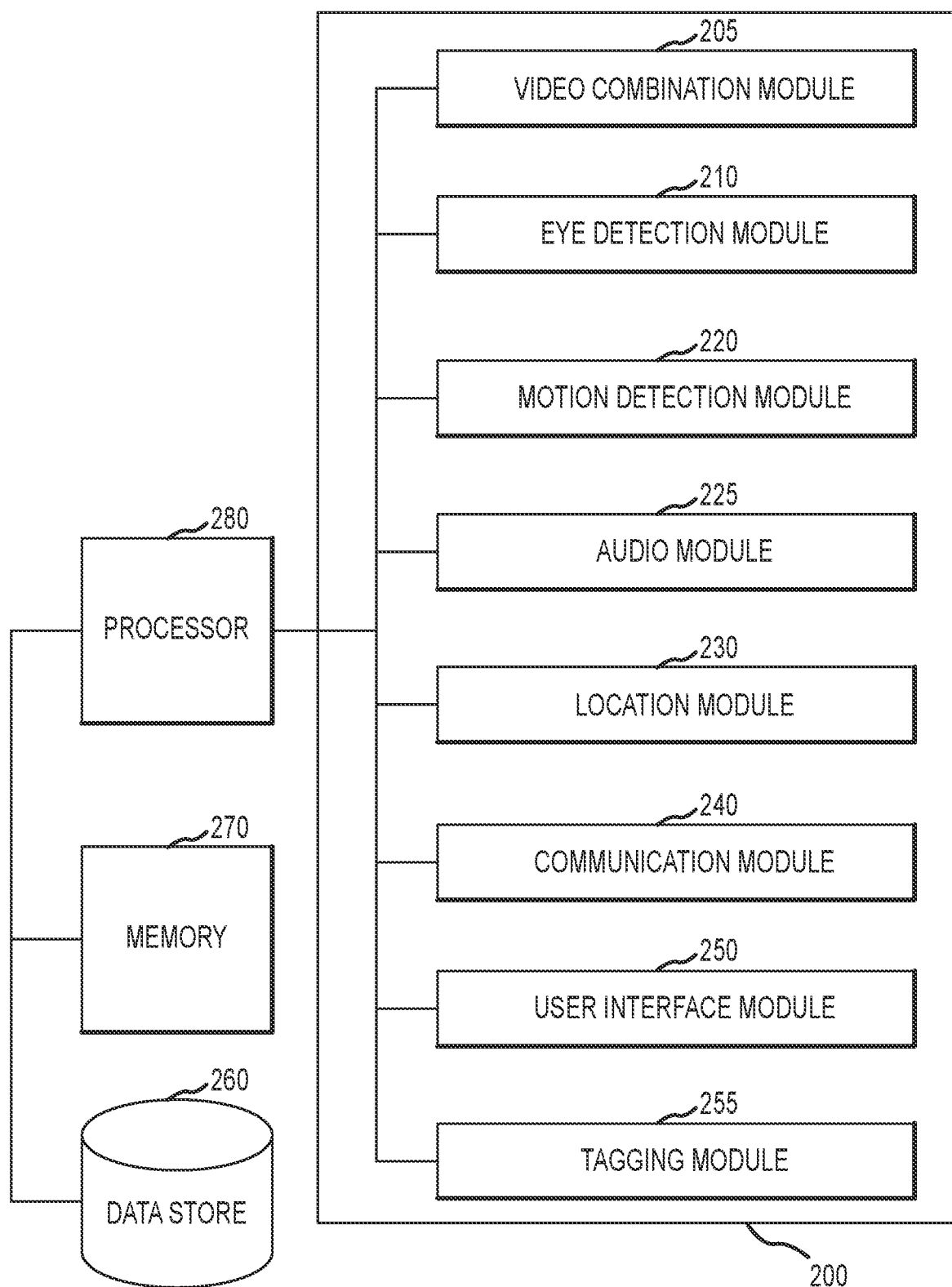
FIG. 2 is a logical block diagram of an application for capturing and rendering dynamic events according to one embodiment of the present invention.

FIG. 2 provides a logical depiction of processes by which a system 200 for capturing and rendering dynamic events interact. As will be appreciated by one of reasonable skill in the relevant art, a portion of the present invention can be embodied in firmware or software. Instructions embodied as program code or software can be stored on a non-transitory storage medium and executed by a processor and recognized a separate functional modules. The storage medium can further store video data from the one or more cameras, audio files, positional information and eye tracking data accessed by the functional modules which thereafter manipulates, modifies and renders the data.

While FIG. 2 illustrates, in one embodiment, a video combination module 205, an eye detection module 200, a motion detection module 220, an audio module 225, a location module 230, a communication module 240, a user interface module 250 and a tagging module. Other modules, data collected by the cameras, microphones and other sensors, can be fashioned and implemented to collect, capture, store and render dynamic events. One of reasonable skill in the relevant art will recognize that the names, separation or configuration of the modules shown in FIG. 2 are illustrative only and not intended to limit the scope of the invention.

One objective of the present invention is the capture and rendering of a 360-degree recreation of a dynamic event. In doing so, data gathered by sensors such as a camera array, microphone array and transceivers are stored in data store 260 or comparable non-transitory storage medium. Instructions, stored in memory 270 and executed by the processor 280, receive and act on the data to produce a useful rendering of a past event or series of events.

Figure 3A:
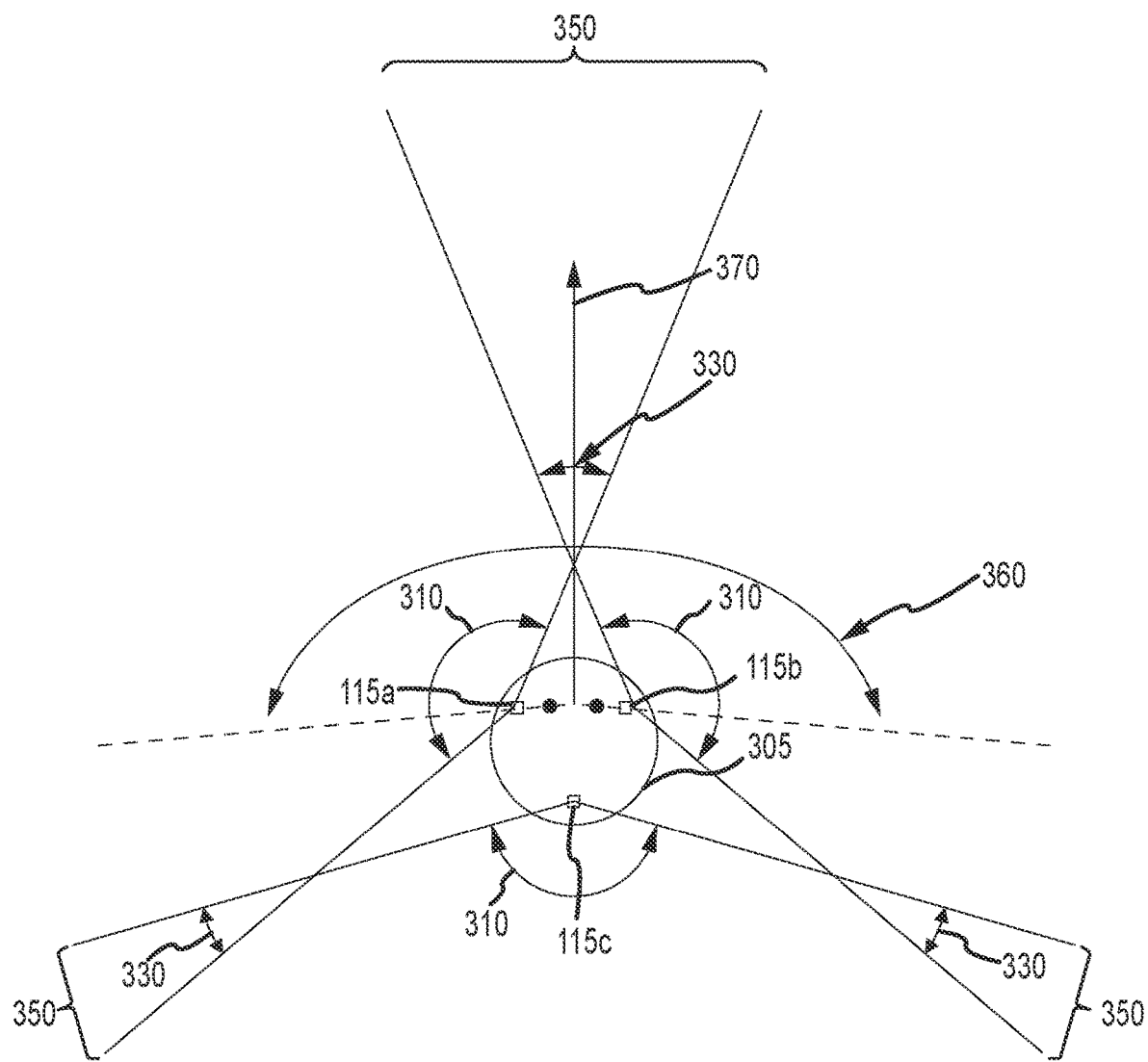
FIG. 3A shows one version of a top, two-dimensional view of overlapping fields of view of a three-camera array associated with an object worn by a user in comparison to the visual field of view of the user, according to one embodiment of the present invention.

A video combination module 205, in one embodiment, joins otherwise separate data streams gathered by cameras affixed to the object into a cohesive 360-degree rendering. The rendering is centered upon the object worn by the user and modified to identity a central plan and a central vision point. With additional reference to FIGS. 3A and 3B, each camera 115a, 115b, 115n includes a defined field of view 310. The object presented in FIG. 3A includes three cameras 115, each with a field of view of 150 degrees. In this illustration a user is facing toward the top of the figure and the object 305 is a helmet worn by the user with a first camera 115a and a second camera 115b positioned near the forward left and right temples of the user. A third camera 115c is positioned near the rear of the helmet 305. The fields of view 310 of each camera 115 are adjusted to equally overlap 330 by approximately 15 degrees.

Data collected from each camera is provided to the video combination module to craft a seamless 360-degree rendering surrounding the user. Data (images) found in each overlap zone 350 is common, in the illustration of FIG. 3, to two cameras. These common objects, horizons, disturbances, and the like can be used as data points by which to modify, align and combine the adjoining video streams. While each camera is similar and may be of the same type, data collected by each will not be identical. Minor modifications in image processing must be corrected (modified) to stitch the images together. Using graphic and central processing techniques the video data stream is configured to provide a 360-degree rendering surrounding the object.

Apart from the stitching of the video images captured by each camera, the 360-degree rendering itself is, in one embodiment, adjusted to conform with the visual field 366 of a user. Recall, each of the cameras in the embodiment shown in FIG. 3 are positioned on/in the object to create overlapping fields of view. While two of the cameras 115a, 115b are somewhat proximate to the human eyes of the user, they are not located in the same location as the user's eyes. Indeed, the cameras and the eyes of the user may be in a different plane or the plane may be not aligned with visual field of the user. The 360-degree rendering is adjusted to provide a central plane aligned with the field of view of the user as well as a central vison point 370 substantially in front of the user. In one embodiment of the present invention, the central vision point 370 of the 360-degree rendering of a user wearing the object as helmet will fall on a substantially perpendicular line extending outward from the midpoint between the two forward cameras.

Figure 3B:
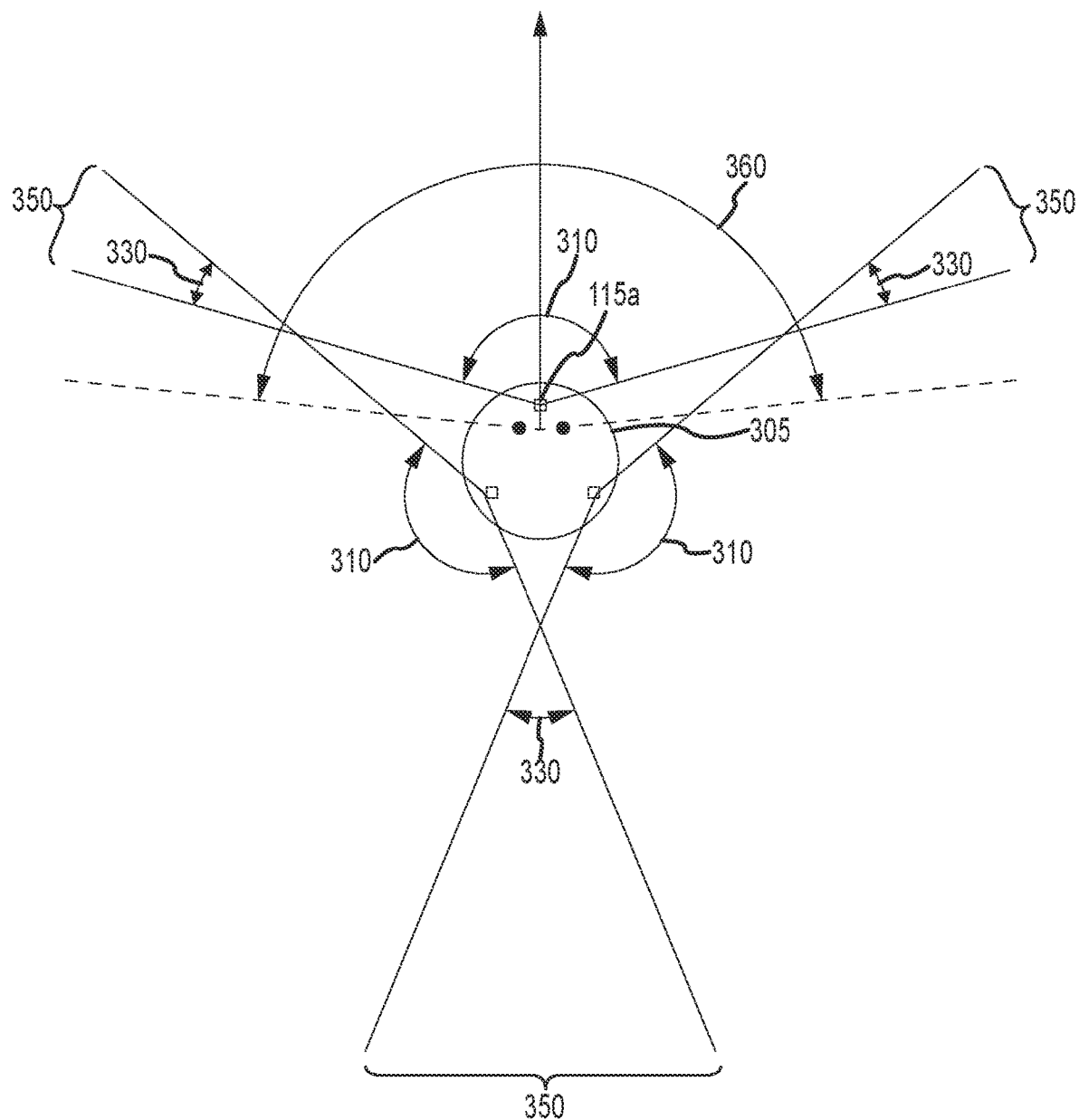
FIG. 3B shows a second version of a top, two-dimensional view of overlapping fields of view of a three-camera array associated with an object worn by a user in comparison to the visual field of view of the user, according to one embodiment of the present invention.

The object presented in FIG. 3B also includes three cameras 115, each with a field of view of 150 degrees but arranged to orient a single camera forward and two to the rear. Again, the user is facing toward the top of the figure and the object 305 is a helmet or the like worn by the user. The first camera 115a is positioned centrally atop the user's eyes. The second and third cameras 115b, 115c are positioned near the rear quadrants of the helmet 305. The fields of view 310 of each camera 115 are adjusted to equally overlap 330 by approximately 15 degrees.

Figure 3C:
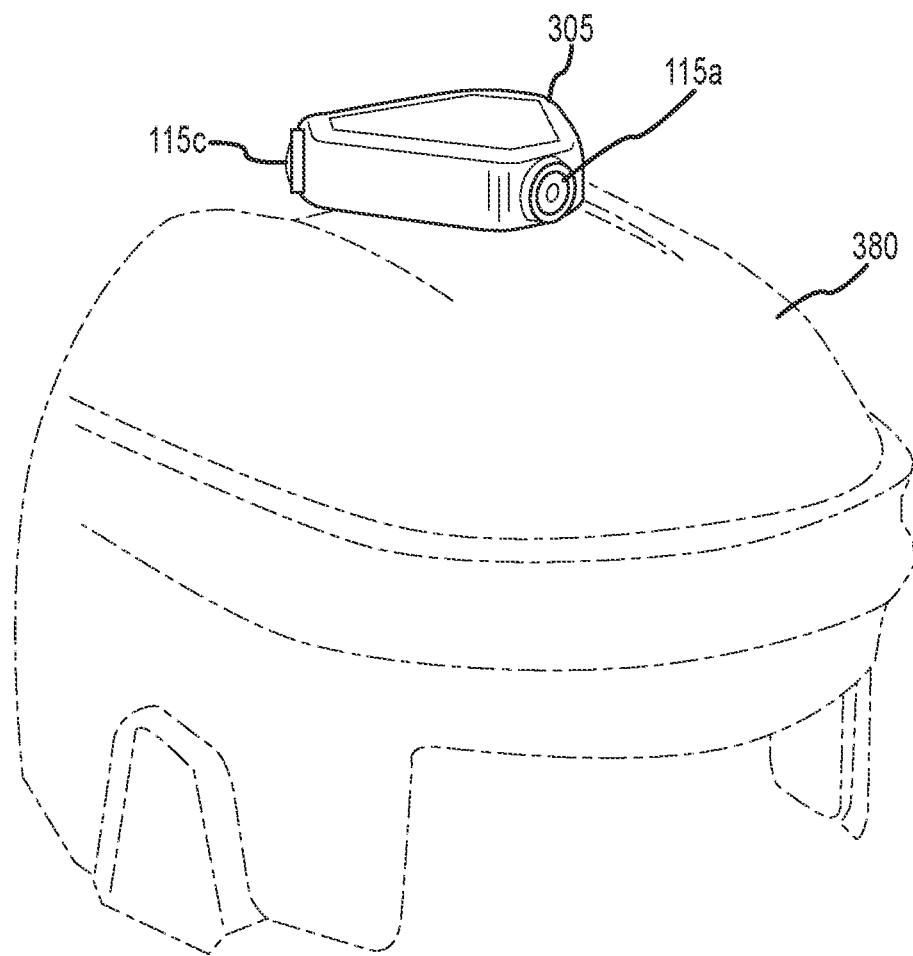
FIG. 3C is a rendition of one embodiment of an object of the present invention as a separate housing affixed to the top of a user's helmet.

In one embodiment, as shown in FIG. 3C, the object 305 of the present invention affixed to the top a player's helmet 380. In this embodiment the housing is triangular in shape with a wide-angle camera 115 positioned at each vertex. Audio sensors are similarly distributed in the housing with the remaining components housed within. The object weighs approximately 250 grams with a profile height of 22 mm and maximum breadth of 79 mm. The device can operate independently on internal power for up to 3 hours with a storage capacity of 64 GB. Cameras are synchronized with a common time stamp as is gyroscopic and accelerometer data. This data can further be used to recognize a resting state as would occur when a player as on the sideline and not actively engaged in the field of play. In such instances the device can power down to a standby mode to conserve power and reactive upon the recognition of certain motion data. Control interfaces are included on the surface of the housing for ease of control.

In one embodiment the size of the object is minimized by having a single forward-facing camera. In some instances, the complexity of the device can be lessened by using a single wide-angle camera to capture the forward aspect of a user's field of view. Certain activities are unidirectional while others are multidirectional. By modifying the scope of coverage weight, cost and complexity can be managed to best fit the demand to capture associated dynamic events.

In an embodiment in which the object worn by the user is a helmet and to which the cameras are affixed or integrated within, the field of view of each camera rotates as the head of the user moves. The visual fixation point of the user however is not always consistent with the position of a user's head.

Humans have a visual fixation point of view in binocular vision of approximately 7 degrees. By rotating one's head and/or moving one's eyes a user can quickly move their visual fixation point to gather data on which to react. The movement of, and accuracy of, a person's head as compared to movement of eyes is dramatic. Eyes are capable of quick and accurate targeting on which to focus. As the head rotates, the eyes capture an image of interest first in peripheral vison and then within the visual fixation point for interpretation.

Eye tracking refers to the process of measuring where a person looks, also known as a point of gaze. These measurements are carried out, in one embodiment, by eye detection and tracker module 210. This module records the position of the eyes and the movements they make in conjunction with the movement of the head as determined by the motion detection module 220. In one embodiment of the present invention an optical method for measuring eye motion is used. In such a method light, typically infrared, is reflected from the eye and sensed by a video camera or some other specially designed optical sensor.

The present invention captures both the movement of the object (helmet) as well as movement of eye with the motion detection 220 and eye detection module 210, respectively. Using accelerometers within the device and a static point of reference, motion of the object is collected and combined with movement of eyes to identify what the user is looking at for any point in time.

An audio module 225 captures and refines audio files detected by the microphone array. As with a user's ears, the microphone array 120 in concert with the audio module 225 of the present invention can determine the relative direction of a particular sound. In the same manner as the human brain, microphones positioned a finite distance apart register he same sound at slightly different times. These differences can be used to determine relative bearing.

Results from each module are synchronized and presented in a user interface as a viewing system enabling a third party or the user themselves to view the dynamic events as if they were in the field of play. In another embodiment of the present invention, a tagging module 225 marks significant events in the data stream. Events worth tagging may be predetermined, manually entered, or determined by the module itself.

The viewing system may include or use a computing device to decode and render a stream of 3D video data on a virtual reality display device. The viewing system may also decode and render a stream of 3D audio data on an audio reproduction device (e.g., a headphone or other suitable speaker devices). The viewing system may include a virtual reality display configured to render the 3D video data and the audio reproduction device configured to render the 3D audio data. The system may be coupled to the network and a user may interact with the viewing system to customize his/her experience.

The viewing system may also include a web viewing device, a user device, a virtual reality device, and/or a console. Various other virtual reality devices may request and/or receive virtual reality content from the virtual reality content delivery network. The web viewing device may include a computer, a laptop, or a tablet. The user device may include a smartphone or a tablet that may include a virtual reality application to play back virtual reality content and/or may require the use of a virtual reality device in conjunction with the smartphone such as, for example.

The viewing system may also track a head orientation of a user. For example, the viewing system may include one or more accelerometers or gyroscopes used to detect a change in the orientation of the user's head. The viewing system may decode and render the stream of 3D video data on a virtual reality display device and the stream of 3D audio data on a speaker system based on the head orientation of the user. As the user changes his or her head orientation, the viewing system may adjust the rendering of the 3D video data and 3D audio data based on changes of the user's head orientation.

The viewing system may provide an immersive viewing experience to the user. For example, the viewing system may include a virtual reality display device that has a wide field of view so that the user viewing the virtual reality content feels like he or she is surrounded by the virtual reality content in a manner similar to in a real-life environment. A complete 360-degree view of the scene is provided to the user, and the user may view the field of play in any direction. As the user moves his or her head, the view is modified to match what the user would see as if he or she were moving his or her head in the real world. Additionally, 3D surrounding sound may be provided to the user based on the user's head orientation to augment the immersive 3D viewing experience. For example, if a player in an immersive movie is currently behind the user, the player's voice may appear to be emanating from behind the user.

The communication module 240 not only receives information from various sensors but also enables the interface module to present data from more than one object at a time. In such a manner, data from multiple objects (users) can be displayed side-by-side to ascertain the position, actions and view of teammates.

The communication module 240 may further transmit data to any of the entities of the system. Similarly, the communication module 240 may receive data from any of the components. The communication module 240 may include one or more Ethernet switches for receiving the processed virtual reality video data from the network and the raw audio data from one or more objects. The communication module 240 may be software including routines for handling communications between the virtual reality processing server and other components of the virtual reality processing server.

In some embodiments, the communication module 240 receives data from components of the virtual reality processing server and stores the data in memory 270 or the data store 260. For example, the communication module 240 may receive virtual reality content from the video combination module 205 and store the virtual reality content in the data store 260 as virtual reality data. In some embodiments, the communication module 260 retrieves data from the memory 270 or data store 260 and sends the data to one or more appropriate components of the virtual reality processing server.

Figure 4:
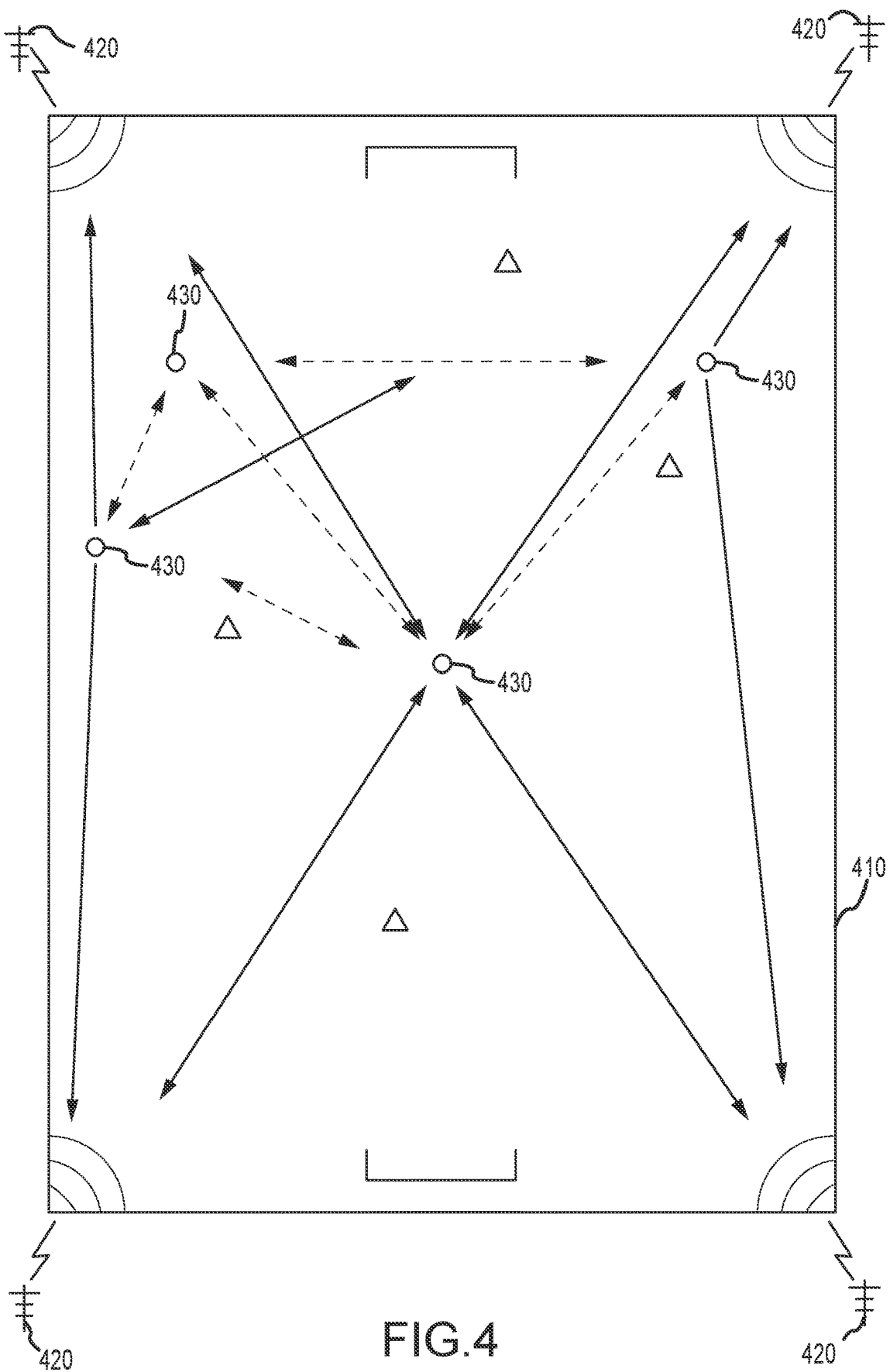
FIG. 4 is a representative field of play having a plurality of players each associated with an object of the present invention and boundaries in which each user's location is determined using trilateration.

To better appreciate the features of the present invention, consider the following example. Consider a hockey team in which the players of one team each wear a helmets fitted with the dynamic event capturing system of the present invention. As shown in FIG. 4, at each corner of the rink 410 is an RF transmitter 420 transmitting a predetermine signal possessing a common time reference.

As the match begins each player fitted with the object 430 of the present invention begins to collect data (video, audio, location, motion, etc.). In one embodiment the video, location, auditory, and motion data is retained internally and downloaded at the conclusion of the match. In another embodiment the data is streamed continuously from each player to a common network server at which the data is processed.

Each helmet fitted with the object 430 of the present invention includes an optical eye tracking system to ascertain where the user (player) was looking during the match relative to the helmet. Events such as faceoffs, penalties, goals and the like are identified (tagged) as key events for later analysis.

Upon completion of the match the data from each camera is stitched together and aligned with the field of view of the player. The central vision point of the 360-degree rendering is further aligned with each user's visual fixation point so that not only can the rendering show a video of everything around the player at any point in time but where, at that point of time, the player was looking. This information is synchronized with audio and motion data to determine if any calls, orders, distractions or impacts may have been experienced.

As the playback progresses it can be stopped at any point in time or at a tagged event to review where the player was looking and review what action(s) the player initiated. Not only can the coach or trainer see what a particular player was seeing but they can also alter the point of view to look where the player was not looking.

For example, a player may have heard a call or distraction and looked toward the baseline or bench at a critical time in a play. The coach can review the player's action and point out that the player should have been looking cross court for a pending pass or similar action from a teammate.

The invention also enables different points of view to be considered concurrently. The video streams from two players can be viewed side-by-side to determine where each player was looking and what clues were presented to each other. Excessive attention to a defensive player or a lack of attention to the location of the puck can be observed and corrected.

The location of each player on the field of play as well as the environment in which the match is played can also be provided. As the viewpoint of each player can be observed and modified, the entire dynamic field of play can be reconstructed offering players and coaches alike an opportunity to analyze tactics, strategies, player positioning and actions.

As described above, some embodiments of the present invention incorporate a virtual reality processor server and interface. Collectively a virtual realty system, one embodiment of the present invention captures real world data in the form of video, audio and positional information to craft a virtual environment that provides a realistic field of play in which players and coaches can manipulate details of the environment and provide opportunities to modify or refine a skill set.

Figure 5:
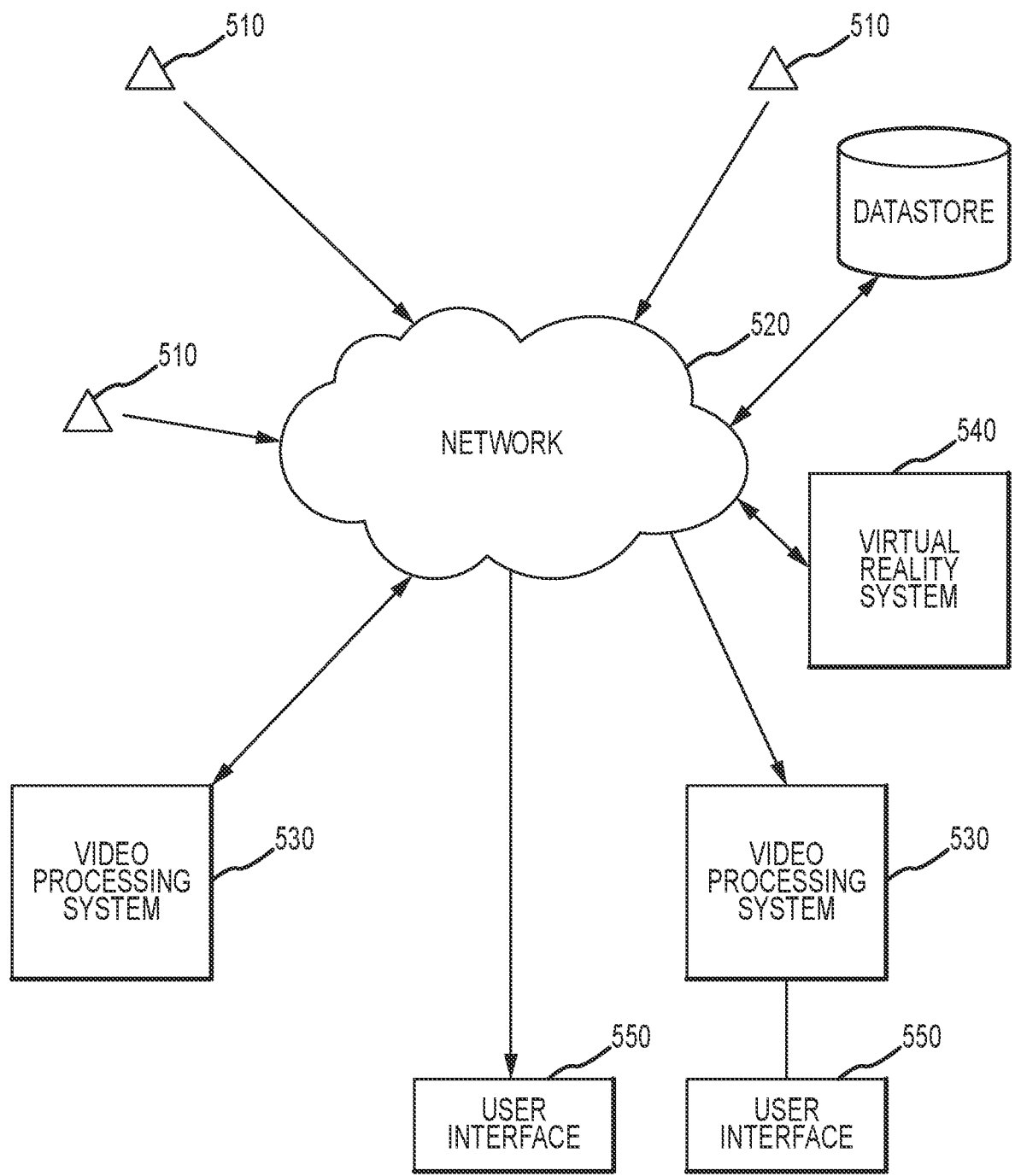
FIG. 5 is a high-level network diagram illustrating the distribute nature of one embodiment of the present invention.

FIG. 5 is a high-level network diagram providing, according to one embodiment of the present invention, a network topology. Objects 510 providing a platform on which to gather video, audio and positional data are communicatively coupled to a network 520. The network may be the public Internet or be a private intranet environment. In one version of the present invention raw data is conveyed through the network 520 to a remote video (data) processing system 530 or server. Inputs from various cameras, audio streams and the like can be synchronized, aligned and stitched together to provide a compressive rendering of the field of play.

In some embodiments, information from the video processing is gathered by a virtual reality system 540. The virtual reality system creates a three-dimensional rendering of the field of play based on collected data. The virtual field of play can be manipulated and presented to users through a user interface, virtual reality googles or the like.

The processing of raw data by the video processing system 530 and the virtual reality system 540 can be cloud based using off-site servers. Using cloud processing capability, the client-based systems for interfacing with the data, real or virtual, can be minimized. In other embodiments video processing can be remote yet located at a secure (private) location. Using the network 520 as a means for transport, data, raw and virtual, can be conveyed to a remote location at which data is processed to its final form and presented through an appropriate user interface 550.

Figure 6:
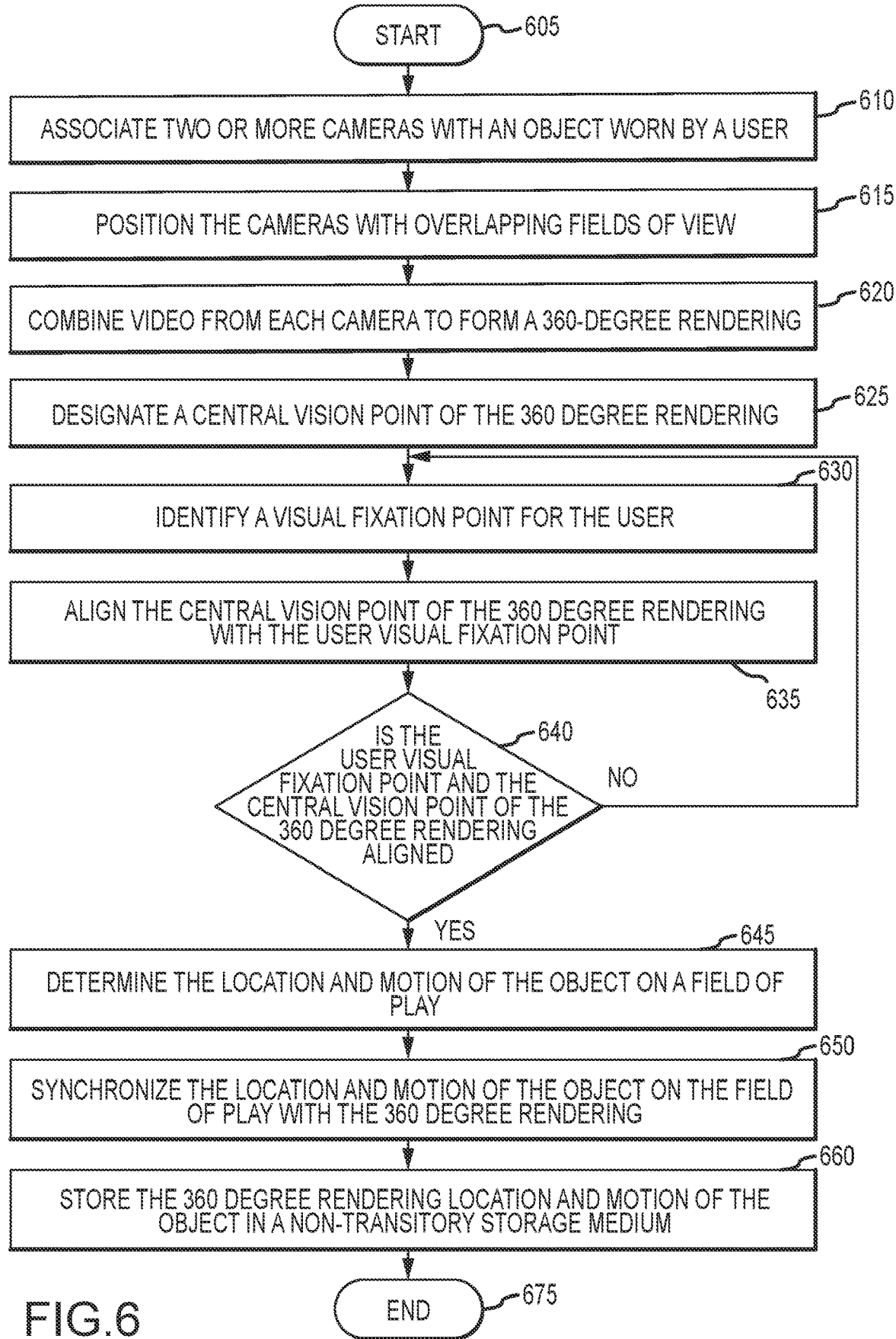
FIG. 6 is a flowchart of a process for capturing and storing a 360-degree rendering of a dynamic event according to one embodiment of the present invention.

The methodology associated with presenting the dynamic renderings of the present invention in its final form begins with capturing streaming video, as illustrated in the flowchart presented in FIG. 6. In the description that follows it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Capturing, processing and rendering dynamic events with a 360-degree field of play view starts 605 with associating 610 two or more cameras with an object worn by a user. Each camera includes a field of view positioned 615 to create an overlapping 360-panarama surrounding the user. Video from each camera is combined 620 forming a 360-degree rendering in which a central vision point is designated 625. The central vision point is a point identified as being directly in front of the user. In a version of the present invention in which the object is mounted on or incorporated into a helmet, the central vision point of the 360-degree rendering would be determined by which way a user would be facing when wearing the helmet. Assuming the helmet is well fit to a user, the central vision point of the 360-degree rendering will substantially coexist with a point directly in front of a user's face.

The process continues by identifying 630 a visual fixation point of the user. From a static position a human possess approximately a 210-degree forward-facing visual field. That field includes a vertical range of approximately 150 degrees. Within that vast range the fixation point, or the point at which humans possess fine resolution, is approximately 6-7 degrees. Eyes can move ±45 degrees in azimuth and ±40 degrees elevation (35 degrees in elevation, 45 degrees in depression) at a rate of more than 100 degrees/second. Accordingly, knowing the direction a player was facing provides limited information as to where the player is looking. The present invention, in one embodiment, identifies the visual fixation point of the user and aligns 635 the central vision point of the 360-degree rendering with the visual fixation point.

As motion, impacts, and adjustments in the object change with respect to the user, the system updates 640 and confirms whether the visual fixation point, and the central vision point are aligned. When they are not the process for aligned is reinitiated.

Location and motion of the object on the field of play is also determined 645. Using techniques described herein and known one of reasonable skill in the relevant art, the location of the object (and thus user) and the objects motion, velocity, movement, is gathered and synchronized 650 with the 360-degree rendering. This visual rendering, along with the objects location motion and related data is stored 660 in a non-transitory storage medium completing 695 the process.

Figure 7:
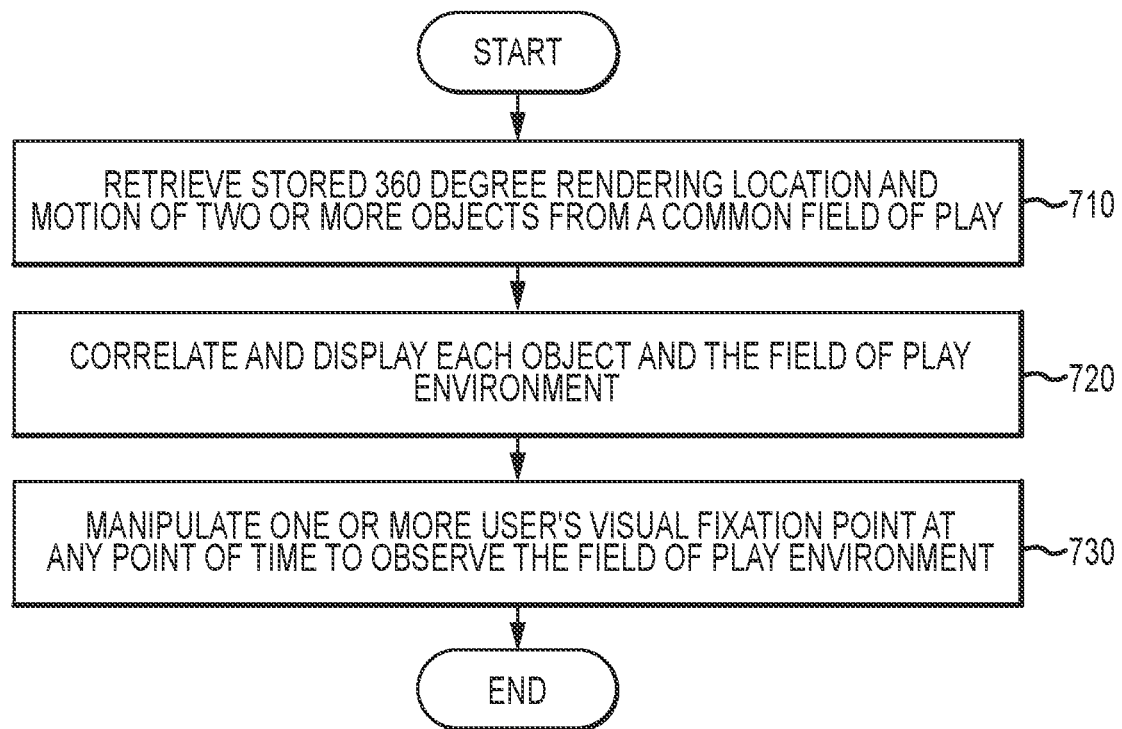
FIG. 7 is a flowchart of a process for retrieving, correlating and rendering select portions of 360-degree rendering, location and motion of a plurality of users in a field of play environment.

Turning with additional reference to FIG. 7, data stored on a non-transitory storage medium is retrieved 710 and correlated 720. The correlated rendering data, motion, location and audio information forms a field of play environment in which the object exists. Through a user interface such as a monitor or a set of virtual reality goggles a user can view the field of play as experienced by a player can manipulate 730 the user's fixation point to observer any point in the field of play environment at any time during the match.

Figure 8:
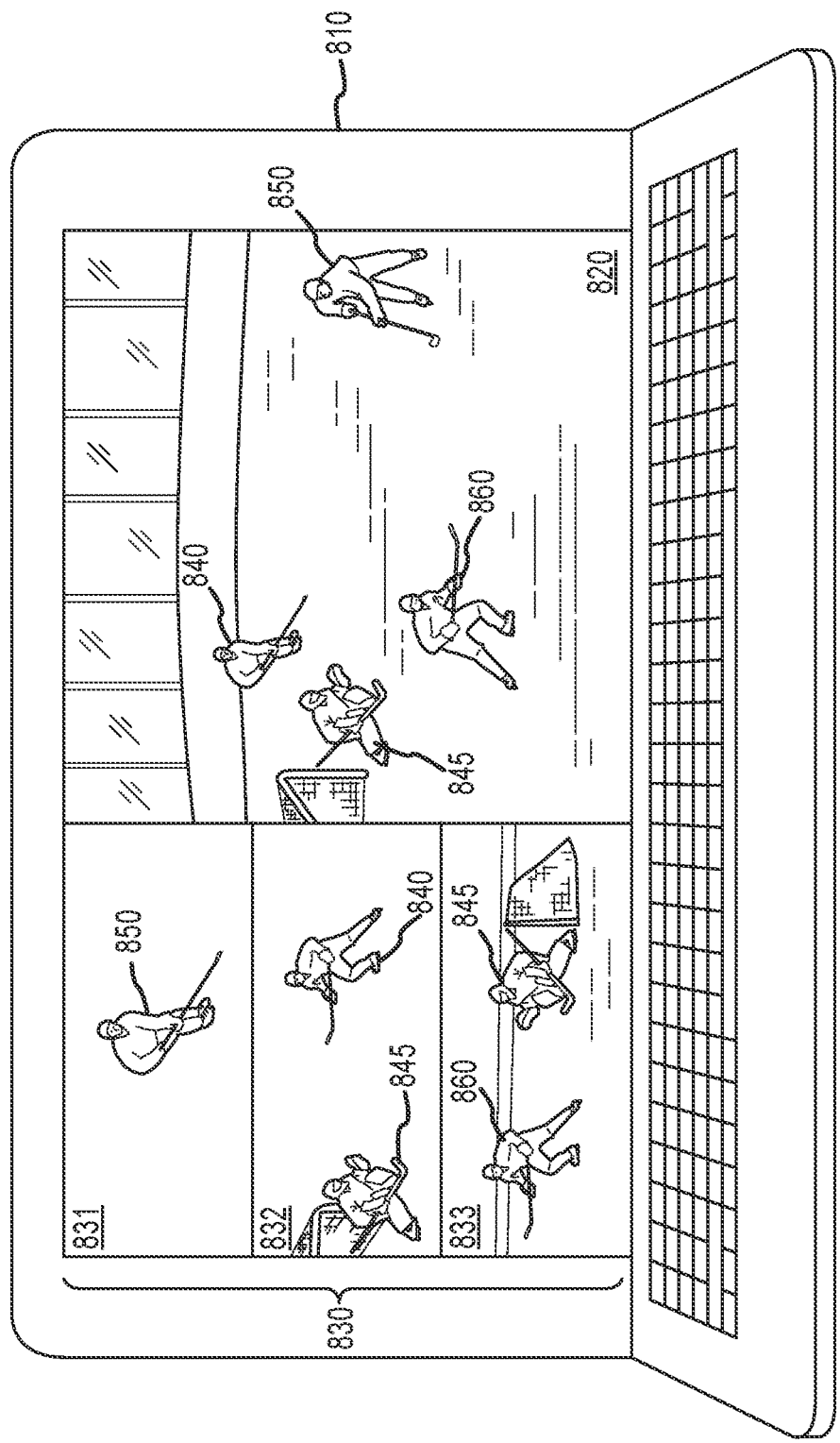
FIG. 8 presents a representative user interface providing multiple views as captured by one or more embodiments of the present invention.

FIG. 8 provides a representative a user interface rendering of data collected by two or more objects of the present invention. In the example shown in FIG. 8, three players in a hockey game equipped with an object of the present invention capture data during a match. Upon completion of the match data from each was collected, processed and synchronized along with a general video of the entire field of play. The user interface shown presents, on a laptop computer 810, the field of play 820, showing the location and movement of each player on the right, and the first person view 830 of each player on the left. The view of each player is combined with data identifying the other players as well other information pertinent to the match. In this example, goalie is a vital player in the action depicted yet the goalie's point of view is not presented. As the video of played and the match reviewed, each player's perspective can be altered. For example, from player 1's point of view 833, player 1 840, who is looking at the goalie 845, can also see players 2 860 who may have open shot to the goal. Player 3 850 is focused 832 on the goal and not cognizant of player 2 860. Player 2 860 sees 831 sees player 3 850 and is not aware of player 1 840. The present invention provides the ability to stop an event and view that event from a different perspective to improve performance and decision making.

Figure 9:
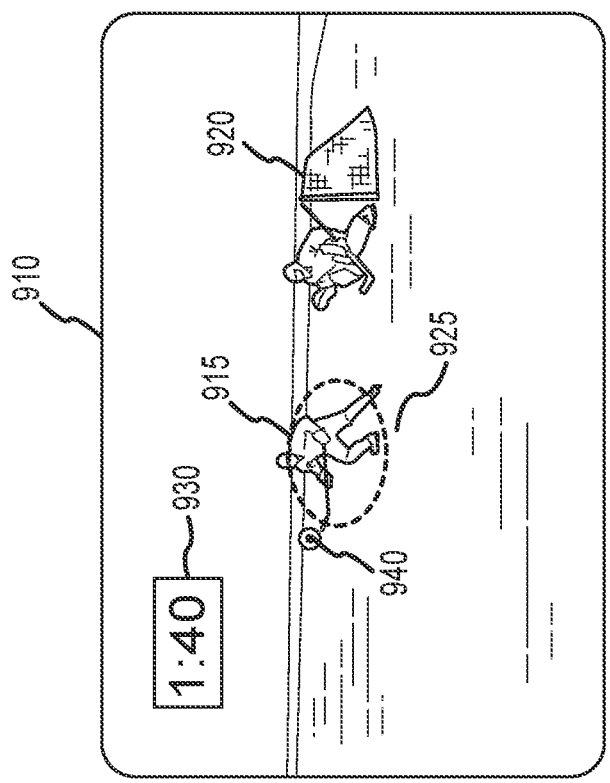
FIG. 9 presents a visual depiction of a portion of a 360-degree rendering used for analysis and teaching according to one embodiment of the present invention.
Figure 9:
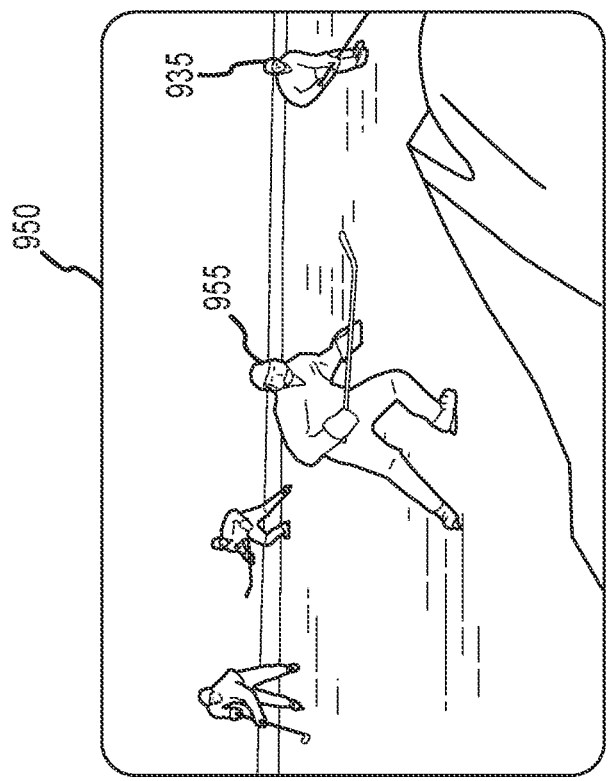

FIG. 9 provides another example of the invention's ability to provide feedback and analysis of a dynamic event. FIG. 9 shows two portions of a player's 360-degree rendering at the same instant in time. The right most rendering 910 is a forward-looking perspective with the left most rendering 950 being a view over the player's left shoulder. In this instance the player has the puck and is looking to pass to the player 915 in front of the goal 920. The player is looking at the end of the hockey stick as illustrated by the players visual fixation point 940. The invention, through data collected, identifies that player as the center 925. As the event unfolds the time it takes for the player to react 930 is shown in the upper left corner. Had the player looked to the left he/she would see a defensive player 955 charging to his/her position emphasizing the need to react quickly. These types of scenarios can be captured and replayed to provide a player with insight and experience in real world environments thereby improving performance.

Another aspect of the present invention is to identify key events in a rendering for later analysis and review. According to one embodiment predetermined events can be marked or tagged in real time in the recorded data. Events such as the beginning of a match, penalties, goals, power plays, time outs, etc. can result in a marking of the recorded data to enable for quick access to important aspects of a match. In another embodiment audio analysis can register a whistle from an official as a tagged event or the accelerometers can register an impact or fall.

In yet another embodiment the tagging module can analyze the 360-degree rendering to identify or tag events that would otherwise go unnoticed. Using historical data, the tagging module can learn formations or movements that present learning opportunities. For example, a certain configuration and placement of offensive and defensive players may warrant a particular approach. That configuration may warrant a tagging in the data. Moreover, a missed opportunity to execute a play or strategy may also warrant a tagging event. As more data is collected the system learns to tag similar event through artificial intelligence. The system possesses the ability to rationalize and take actions that have the best chance of achieving a specific goal of identifying key learning moments. Upon determining that the current instructions are inadequate to meet that goal, the module can automatically learn from and adapt to new data without being assisted by humans.

The dynamic event capturing and rendering system of the present invention can enable players, coaches and officials alike relive a match, game or any dynamic event. By associating an object of the present invention capable of capturing video, audio, and positional data with a user on a field of play, a 360-degree rendering of that field of play and match environment from a user's (player's) perspective can be gained. Not only can a player, coach or official look a back at what has happened, but they can see the match from the user's perspective as well as be provided a view from where the user was not looking. Key aspects of a player's or official's actions can be identified and improved.

For example, a coach may playback a missed opportunity and show a player that instead of looking at this player, he/she should have been looking at a different area of the rink, earth or field. Or an official might see that based on the action, he/she should be positioned in this portion of the rink, earth or field and looking in this area to identify infractions.

Moreover, the presentation invention can be used as a virtual environment to modify the field of play, yet provide the user with a realistic environment. The system can learn from itself to identify key events and missed opportunities to be later reviewed.

Upon reading this disclosure, those of skill in the art will appreciate still additional alternative structural and functional designs for a system and a process for dynamic event capturing and rendering through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. Indeed, while the examples herein have been provided in the context of a hockey match, the present invention is equally applicable to other environments such as football, lacrosse, basketball, tactical training environments, and the like.

Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. As discussed herein, the invention may also be practiced in distributed computing environments where tasks are performed by remote processing devices that are linked through a communications network. In a distributed computing environment, program modules may be located in both local and remote memory storage devices.

An exemplary system for implementing the invention includes a general-purpose computing device such as the form of a conventional personal computer, server, or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

An implementation of the present invention may also be executed in a Web environment, where software installation packages are downloaded using a protocol such as the HyperText Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network, as well as a multi-tier environment. Furthermore, it may happen that the client and server of a particular installation both reside in the same physical device, in which case a network connection is not required.

While there have been described above the principles of the present invention in conjunction with a device and associated methodology for capture and rendering of a dynamic event, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:

1. A dynamic event capture and rendering system, comprising a non-transitory storage medium tangibly embodying a program of instructions wherein said program of instruction comprises a plurality of program codes;
  a data collection object wearable by a user;
  one or more sensors configured to collect location and motion data of the data collection object within a sports field of play, location and motion data of one or more other data collection objects worn by other users within the sports field of play, location and motion data of one or more non-data collection wearing users within the sports field of play and a fixation point identifying where the user is looking;
  two or more cameras affixed to the data collection object, the two or more cameras having overlapping fields of view, wherein the two or more cameras are configured to capture a panoramic 360-degree rendering around the user, wherein the panoramic 360-degree rendering includes the sports field of play and the one or more other data collection objects and the one or more non-data collection wearing users in the sports field of play; and
  at least one processor communicatively coupled to the non-transitory storage medium and the two or more cameras and configured to execute several of the program codes, said program codes including
    program code for combining video from the two or more cameras forming the 360-degree rendering wherein the rendering includes a central plane of the sports field of play, a central vision point of the user as determined by an orientation of the data collection object, the fixation point of the user, and wherein the 360-degree rendering is independent of the central vision point and the fixation point,
    program code for determining a location of the data collection object and a motion of the data collection object within the field of play,
    program code for determining and correlating a location of the other data collection objects relative to the data collection object and a motion of the other data collection objects relative to the data collection object, both within the sports field of play,
    program code for determining and correlating a location of the non-data collection object wearing users relative to the data collection object and a motion of the non-data collection object wearing users relative to the data collection object, both within the sports field of play,
    program code for synchronizing the 360-degree rendering with the location and the motion of the data collection object, the location and motion of the other data collection objects and the non-data collection object wearing users,
    program code for storing and thereafter retrieving the 360-degree rendering and data with respect to the data collection object, the location and the motion of the data collection object, the location and motion of the other data collection objects, and the location and motion of the non-data collection object wearing users, all of the aforementioned in the sports field of play, and
    program code for alternatively selecting one or more display views of the data collection object, the location and the motion of the data collection object, the central vision point of the user, the fixation point of the user, the location and motion of the other data collection objects, and the location and motion of the non-data collection object wearing users, all of the aforementioned in the sports field of play.

2. The dynamic event capture and rendering system of claim 1, wherein the data collection object is a helmet.

3. The dynamic event capture and rendering system of claim 1, wherein the data collection object is a low-profile housing affixed to a helmet.

4. The dynamic event capture and rendering system of claim 1, further comprising program code for modifying the central plane of the 360-degree rendering to align with a visual field of the user.

5. The dynamic event capture and rendering system of claim 1, further comprising program code for detecting eye movement of the user relative to the data collection object identifying the fixation point of the user.

6. The dynamic event capture and rendering system of claim 5, further comprising program code for identifying the fixation point in the 360-degree rendering.

7. The dynamic event capture and rendering system of claim 1, further comprising a transceiver.

8. The dynamic event capture and rendering system of claim 7, wherein determining includes identifying a presence of one or more nearby data collection objects, determining a relational location of each of the one or more nearby data collection objects, and developing a spatial awareness of a local environment surrounding the data collection object including the one or more nearby data collection objects.

9. The dynamic event capture and rendering system of claim 7, wherein determining includes receiving a signal from one or more transmitters affixed at a known location relative to the sports field of play and ascertaining the location of the data collection object using trilateration based on the signal received from the one or more transmitters.

10. The dynamic event capture and rendering system of claim 7, further comprising program code for transmitting the 360-degree rendering, the location, and the motion of the data collection object.

11. The dynamic event capture and rendering system of claim 1, wherein determining includes correlating the location of the data collection object with an overhead video rendering of the sports field of play.

12. The dynamic event capture and rendering system of claim 1, further comprising program code for displaying on a user interface a select portion of the 360-degree rendering of the data collection object as a first data collection object along with the location of the first data collection object on the sports field of play.

13. The dynamic event capture and rendering system of claim 12, further comprising program code for displaying on a user interface a select portion of the 360-degree rendering of the one or more other data collection objects along with the location of the one or more other data collection objects on the sports field of play, the location of the first data collection object on the sports field of play and the select portion of the 360-degree rendering of the first data collection object.

14. The dynamic event capture and rendering system of claim 1, further comprising a virtual realty data store and program code for a virtual reality environment related to the sports field of play.

15. The dynamic event capture and rendering system of claim 1, further comprising program code of integrating the 360-degree rendering of the object along with the location of the data collection object on the sports field of play with a virtual reality environment related to the sports field of play.

16. A method for dynamic event capturing and rendering, the method comprising:
   collecting, by one or more sensors, location and motion data of a data collection object wearable by a user within a sports field of play, location and motion data of one or more other data collection objects wearable by other users within the sports field of play, location and motion data of one or more non-data collection wearing users within the sports field of play, and a fixation point of the user identifying where the user is looking;
   capturing, by each of two or more cameras having overlapping fields of view and affixed to the data collection object, a panoramic 360-degree rendering around the user, wherein the panoramic 360-degree rendering includes the sports field of play and the one or more other data collection objects and the one or more non-data collection wearing users in the sports field of play;
   retrieving, from a non-transitory storage medium, a program of instructions wherein said program of instruction comprises a plurality of program codes; and
   by at least one processor, accessing captured video from the two or more cameras and executing several of the program codes retrieved from the non- transitory storage medium, said program codes directing the one or more processors to
      combine video from the two or more cameras to form the 360-degree rendering wherein the rendering includes a central plane of the sports field of play, a central vision point of the user as determined by an orientation of the data collection object, and the fixation point of the user and wherein the 360-degree rendering is independent of the central vision point and the fixation point,
      determine a location of the data collection object and a motion of the data collection object within the sports field of play,
      determine and correlate a location of the other data collection objects relative to the data collection object and a motion of the other data collection objects relative to the data collection object, both within the sports field of play,
      determine and correlate a location of the non-data collection object wearing users relative to the data collection object and a motion of the non-data collection object wearing users relative to the data collection object, both within the sports field of play,
      synchronize the 360-degree rendering with the location and the motion of the data collection object and the location and motion of the other data collection objects and the non-data collection object wearing users,
      store and retrieve the 360-degree rendering and data with respect to the data collection object, the location and the motion of the data collection object the location and motion of the other data collection objects and the location and motion of the non-data collection object wearing users, and
      display, selectively and alternatively, one or more views of the data collection object, the location and the motion of the data collection object, the central vision point of the user, the fixation point of the user, and the location and motion of the other data collection objects, and the location and motion of the non-data collection object wearing users, all of the aforementioned in the sports field of play.

17. The method for dynamic event capturing and rendering of claim 16, wherein the one or more processors modify the central plane of the 360-degree rendering to align with a visual field of the user.

18. The method for dynamic event capturing and rendering of claim 16, wherein the one or more processors detect eye movement of the user relative to the data collection object identifying the user visual fixation point.

19. The method for dynamic event capturing and rendering of claim 18, wherein the one or more processors identify the user visual fixation point in the 360-degree rendering.

20. The method for dynamic event capturing and rendering of claim 16, wherein the one or more processors identify a presence of one or more nearby data collection objects, determine a relational location of each of the one or more nearby data collection objects with the data collection object, and develop a spatial awareness of a local environment surrounding the data collection object including the one or more nearby data collection objects.

21. The method for dynamic event capturing and rendering of claim 16, wherein the one or more processors receive from a transceiver a signal from one or more transmitters affixed at a known location relative to the sports field of play and ascertain the location of the data collection object using trilateration based on the signal received from the one or more transmitters.

22. The method for dynamic event capturing and rendering of claim 16, further comprising transmitting, by a transceiver, the 360-degree rendering, the location, and the motion of the data collection object.

23. The method for dynamic event capturing and rendering of claim 16, further comprising transmitting, by a transceiver, the captured video.

24. The method for dynamic event capturing and rendering of claim 16, wherein the one or more processors correlate the location of the data collection object with an overhead video rendering of the sports field of play.

25. The method for dynamic event capturing and rendering of claim 16, wherein the one or more processors display on a user interface a select portion of the 360-degree rendering of a first data collection object along with the location of the first data collection object on the sports field of play.

26. The method for dynamic event capturing and rendering of claim 25, wherein the one or more processors display on a user interface a select portion of the 360-degree rendering of the one or more other data collection objects along with the location of the one or more other data collection objects on the sports field of play, the location of the first data collection object on the sports field of play and the select portion of the 360-degree rendering of the first data collection object.

27. The method for dynamic event capturing and rendering of claim 16, wherein the one or more processors integrate the 360-degree rendering of the data collection object along with the location of the object on the sports field of play with a virtual reality environment related to the sports field of play.

\* \* \* \* \*